(12) United States Patent
Van Scyoc et al.

(10) Patent No.: US 6,799,605 B1
(45) Date of Patent: Oct. 5, 2004

(54) QUICK-ACTION MULTI-PORT FLUID COUPLER

(75) Inventors: Thomas William Van Scyoc, Gastonia, NC (US); Thomas Anthony Davis, Charlotte, NC (US)

(73) Assignee: Perfecting Coupling Company, Charlotte, NC (US)

( * ) Notice: Subject to any disclaimer, the term of this patent is extended or adjusted under 35 U.S.C. 154(b) by 0 days.

(21) Appl. No.: 10/720,663

(22) Filed: Nov. 24, 2003

(51) Int. Cl.[7] .............................................. F16L 37/32
(52) U.S. Cl. ........................... 137/614.03; 137/614.04; 137/594
(58) Field of Search ........................ 137/614.03, 614.04, 137/614.05, 614, 594, 595

(56) References Cited

U.S. PATENT DOCUMENTS

| | | | |
|---|---|---|---|
| 2,896,977 A | * | 7/1959 | Hansen .................. 137/614.04 |
| 3,055,405 A | * | 9/1962 | Pase .......................... 141/207 |
| 3,503,634 A | | 3/1970 | Cadiou |
| 3,590,855 A | | 7/1971 | Woollen et al |
| 3,747,632 A | | 7/1973 | Kok et al |
| 4,058,120 A | * | 11/1977 | Caparrelli et al. ..... 137/614.04 |
| 4,247,135 A | | 1/1981 | Weirich et al. |
| 4,544,185 A | | 10/1985 | Weirich et al. |
| 4,553,573 A | | 11/1985 | McGarrah |
| 4,630,847 A | | 12/1986 | Blenkush |
| 4,641,693 A | | 2/1987 | Rakucewicz |
| 4,703,957 A | | 11/1987 | Blenkush |
| 5,042,692 A | | 8/1991 | Valiyee et al. |
| 5,366,117 A | | 11/1994 | Mesenbring et al. |
| 5,566,863 A | | 10/1996 | Mesenbring et al. |
| 5,639,064 A | | 6/1997 | deCler et al. |
| 5,791,376 A | * | 8/1998 | Richmond ............. 137/614.04 |
| 6,170,882 B1 | | 1/2001 | Prest |

* cited by examiner

Primary Examiner—Kevin Lee
(74) Attorney, Agent, or Firm—Alston & Bird LLP

(57) ABSTRACT

A quick-action multi-port fluid coupling having a socket member and a plug member each housing a plurality of coupling devices arranged in a non-linear array. A cam arrangement is provided for axially drawing the plug member into the socket member in a leveraged manner so that the coupling devices can be connected under fluid pressure with relatively little manual force required. The coupling can also include an alignment arrangement that ensures that no contact occurs between the cooperative coupling devices until the coupling members are in proper alignment relative to each other.

22 Claims, 2 Drawing Sheets

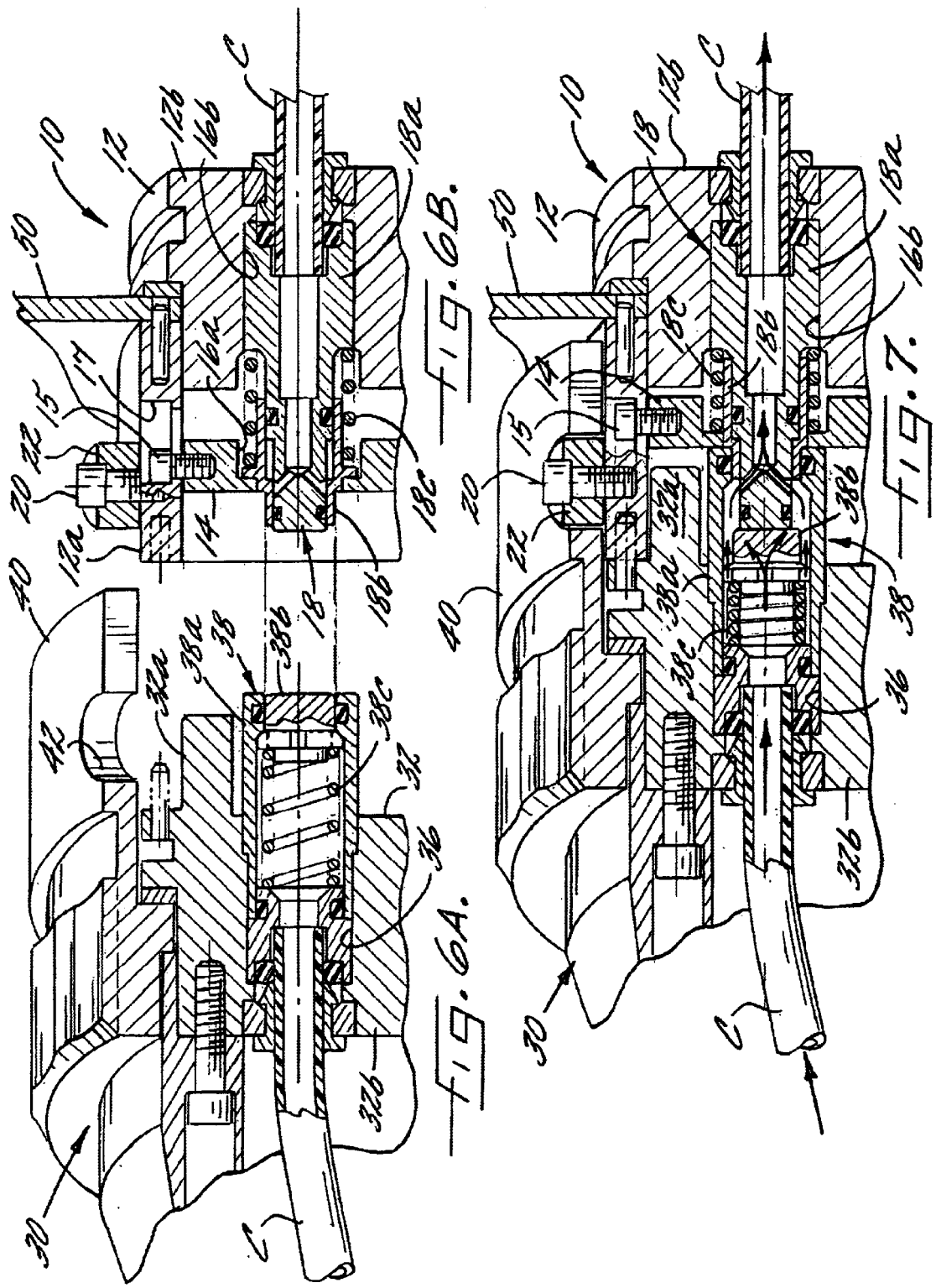

QUICK-ACTION MULTI-PORT FLUID COUPLER

FIELD OF THE INVENTION

The invention relates to quick-connect, quick-disconnect fluid couplers for coupling together fluid-conducting conduits, and relates more particularly to a multi-port fluid coupler for simultaneously coupling together a plurality of fluid-conducting conduits with a like number of other conduits.

BACKGROUND OF THE INVENTION

Quick-connect, quick-disconnect fluid coupling devices (hereinafter referred to as "quick-action fluid couplers") are used in various applications for effecting a rapid connection between two or more fluid-conducting conduits. In general, a quick-action fluid coupler includes a plug member and a cooperative socket member. The plug member is inserted coaxially into the socket member to establish a flow path therebetween. Quick-action fluid couplers generally include a latching arrangement, typically comprising latching balls and detents, to hold the plug member in the socket member. In a quick-action fluid coupler designed to be connected while the fluid in the conduits is under pressure, the socket and plug members include valves that are closed when the plug and socket members are disengaged from each other. The valves are opened by the action of pushing the plug member into the socket member. Quick-action fluid couplers of this type are referred to herein as "valved, push-to-connect" couplers. An example of a valved, push-to-connect coupling device is described in commonly assigned U.S. Pat. No. 6,158,717, incorporated herein by reference.

The quick-action fluid coupler described in the '717 patent connects a single fluid-conducting conduit to another fluid-conducting conduit. In some applications, it is desirable to connect a plurality of conduits to a like number of other conduits, and to do so simultaneously. Various types of multi-port couplers have been developed in this regard. For instance, U.S. Pat. No. 4,553,573 to McGarrah and U.S. Pat. No. 4,641,693 to Rakucewicz disclose a multi-port connector having valved push-to-connect coupling devices arranged in non-linear arrays in each of a socket member and a plug member. The plug member is manually pushed axially into the socket member until locking balls provided in the socket member are biased radially inwardly to engage an annular groove formed in the plug member, thus locking the members together. A drawback of this arrangement is that it can take significant axial force to overcome the fluid pressure on the valves in the coupling members so as to move the valves into their open positions. Some people may not find it possible to apply enough force to accomplish the connection, particularly when the fluid in the conduits is under substantial pressure. Additionally, the devices of McGarrah and Rakucewicz ensure proper alignment of the cooperative coupling devices by sizing two of the plug-type coupling devices 28 and 30 (FIG. 2) larger in diameter than the rest, and correspondingly making two of the socket-type coupling devices 52 and 54 (FIG. 6) larger than the rest. With this arrangement, it is possible to smear the plug-type coupling devices over the end faces of the socket-type coupling devices, which is undesirable because cross-contamination can occur between the different fluid supplies; furthermore, it may be desirable in some cases to have all of the coupling devices of the same diameter, which is not possible with McGarrah's and Rakucewicz's alignment arrangement.

SUMMARY OF THE INVENTION

The present invention addresses the above needs and achieves other advantages, by providing a multi-port fluid coupling having a cam arrangement for axially drawing the plug member into the socket member in a leveraged manner so that the fluid lines can be connected under pressure with relatively little manual force required, and/or having an alignment arrangement that ensures that no contact occurs between the cooperative coupling devices until the coupling members are in proper alignment relative to each other, thereby avoiding cross-contamination.

In accordance with one embodiment of the invention, a quick-action multi-port fluid coupling for simultaneously connecting a plurality of first fluid lines to corresponding second fluid lines comprises a socket member and a plug member. The socket member has a tubular socket body defining a cavity therein, the socket member further comprising a plurality of valved, push-to-connect first coupling devices mounted within the cavity and arranged in a non-linear array. The plug member has a tubular plug body defining a cavity therein, the plug member further comprising a plurality of valved, push-to-connect second coupling devices mounted within the cavity of the plug body and arranged in a non-linear array matching that of the first coupling devices, each second coupling device being configured to connect with a corresponding one of the first coupling devices when the coupling devices are axially pushed together such that valves of the coupling devices are opened to establish a flow path therebetween. The plug body has a substantially cylindrical outer surface of smaller diameter than the inner surface of the socket body such that the forward end of the plug body is axially receivable into the forward end of the socket body to cause the front end faces of the second coupling devices to abut the front end faces of the first coupling devices, further axial movement of the plug body into the socket body causing the first and second coupling devices to be connected. The multi-port fluid coupling also includes cooperative first and second cam members respectively mounted on the socket member and plug member and engageable with each other upon initial engagement of the plug member with the socket member, one of the first and second cam members being rotatable relative to the other about an axis of the multi-port fluid coupling so as to axially advance the plug body into the socket body to connect the first and second coupling devices.

In one preferred embodiment, the cam members comprise cam followers mounted on the socket member and cam surfaces defined by slots in an actuator that is rotatably mounted about the plug body. When the plug body is initially engaged in the socket body, the cam followers engage the cam surfaces of the actuator. Rotation of the actuator about the axis of the coupling causes the cam followers to ride along the cam surfaces, thereby axially drawing the plug body into the socket body.

A coupling in accordance with the invention can also include male alignment members mounted on one of the socket and plug bodies and female alignment members defined in the other of the socket and plug bodies. The female alignment members are aligned with the male alignment members in only one rotational orientation of the plug body relative to the socket body in which orientation the first and second coupling devices are properly aligned. The male alignment members are arranged to contact the other of the socket and plug bodies to prevent the front end faces of the first and second coupling device from coming into contact until the male alignment members are engaged in the female alignment members. The male alignment members can comprise pins mounted on the plug member radially outward of the plug body and the female alignment members can comprise holes formed in the socket body for receiving the pins. The pins and holes are circumferentially spaced non-uniformly so that all of the pins align with corresponding holes in only one rotational orientation of the plug body. The pins preferably are arranged in pairs that are circumferentially spaced non-uniformly, and the spacing between the pins of each pair preferably is different from the spacing between the pins of the other pairs.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6A is a cross-sectional view through the plug member along line 6A—6A in FIG. 4, showing details of one of the coupling devices and its arrangement within the plug member;

Figures 4, 5:
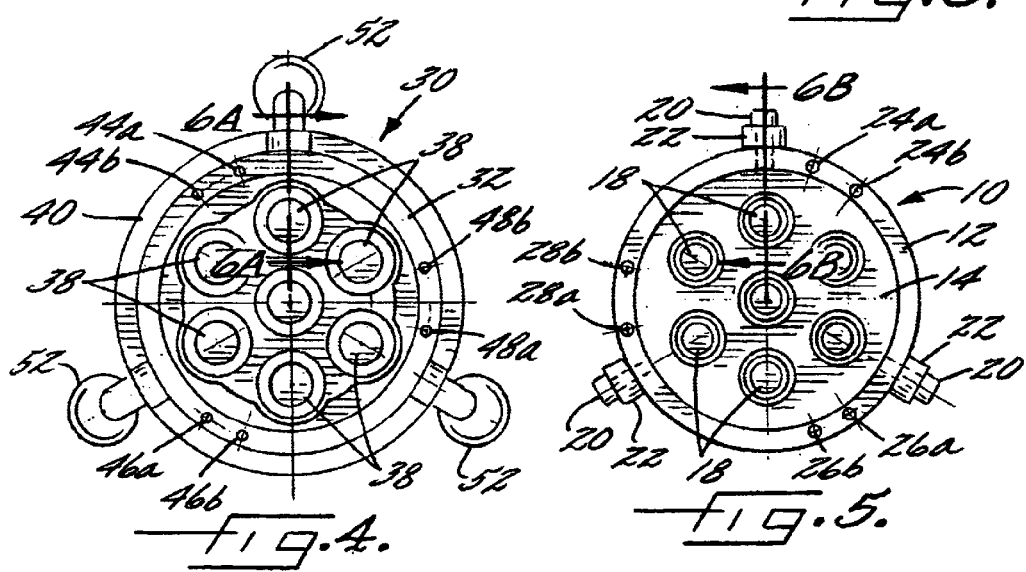
FIG. 4 is a view looking into the forward end of the plug member in the direction indicated by line 4—4 in FIG. 2.
FIG. 5 is a view looking into the forward end of the socket member in the direction indicated by line 5—5 in FIG. 3.

FIG. 6B is a cross-sectional view through the socket member along line 6B—6B in FIG. 5, showing details of one of the coupling devices (corresponding to the coupling device of the plug member in FIG. 6A) and its arrangement within the socket member; and FIG. 7 is a cross-sectional view of the quick-action coupler in a coupled condition, showing the coupling devices of FIGS. 6A and 6B coupled together.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
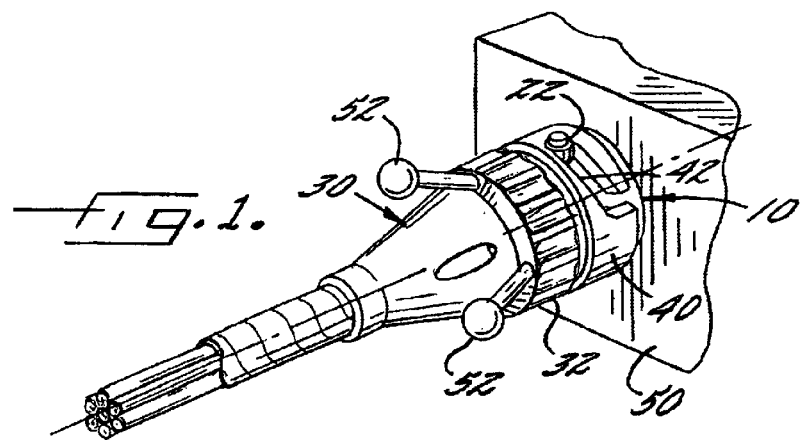
FIG. 1 is a perspective view of a quick-action fluid coupler in accordance with one embodiment of the invention, shown in a connected condition.
Figures 2, 3:
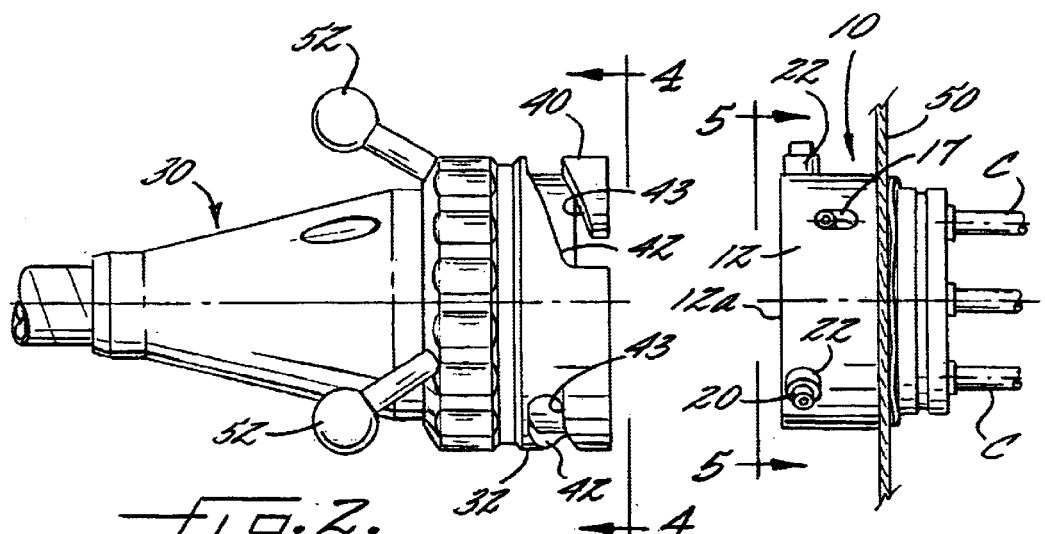
FIG. 2 is a side elevation of a plug member of the quick-action fluid coupler.
FIG. 3 is a side elevation of a socket member of the quick-action fluid coupler.

FIG. 1 depicts a quick-action fluid coupler in accordance with one embodiment of the invention, and FIGS. 2 and 3 respectively show a plug member 30 and a socket member 10 of the coupler. FIGS. 4 and 6A show the plug member 30 in further detail, and FIGS. 5 and 6B show the socket member 10 in further detail. The socket member 10 includes a socket body 12 having a forward portion 12a that is tubular and defines a generally cylindrical inner surface. The forward portion 12a of the socket body 12 defines an internal cavity in which a disk-shaped plunger 14 is mounted so as to be axially slidable within the cavity of the socket body. The plunger 14 is spaced axially rearward of a forward end of the socket body 12 as best seen in FIG. 6B. The plunger 14 is connected to the socket body 12 with screws 15 that extend radially outwardly from the outer periphery of the plunger and extend through axially elongated holes 17 formed radially through the tubular forward portion 12a of the socket body, thus allowing the plunger to move axially within the limits determined by the axial length of the holes 17. The plunger 14 defines a plurality of spaced apertures 16a (one of which is shown in FIG. 6B) extending axially through the plunger and arranged in a non-linear array. Apertures 16b (one of which is shown in FIG. 6B) corresponding in number and position to the apertures 16a are defined in a generally solid cylindrical rear portion 12b of the socket body. A plurality of first coupling devices 18 are supported by the socket body 12. In particular, rear ends of the first coupling devices 18 extend through and are fixed in the apertures 16b in the rear portion of the socket body. Forward ends of the first coupling devices 18 extend through the apertures 16a in the plunger; the forward ends of the first coupling devices 18 advantageously are spaced axially rearward of the forward end of the socket body 12.

Each first coupling device 18 comprises a fixed valve stem 18a that is fixedly secured in the rear portion 12b of the socket body and extends through the aperture 16a in the plunger 14. A valve member 18b of tubular form surrounds the forward portion of the valve stem 18a and extends through the aperture 16a in the plunger. The valve member 18b is axially slidable relative to the valve stem 18a. The aperture 16a is stepped (smaller diameter at the forward side and larger diameter at the rear side of the plunger), and the valve member 18b includes a stop that projects radially outwardly and abuts the step of the aperture 16a to limit forward movement of the valve member. A compression spring 18c is arranged between the rear portion 12b of the socket body and the valve member 18b to bias the valve member 18b and the plunger 14 forwardly. The valve stem 18a includes a central flow passage that extends axially from the rear end of the valve stem partway along the length of the valve stem; the central passage is connected at its forward end to one or more generally radially extending passages that extend to the outer cylindrical surface of the valve stem; the rear end of the central passage is connected to a fluid conduit C. The generally radially extending passages are covered by the valve member 18b when the valve member is in its forwardmost position as urged by the spring 18c, such as when the socket member 10 is uncoupled from the plug member 30. When the valve member 18b and plunger 14 are pushed axially rearward, the radial passages in the valve stem 18a become uncovered so that fluid can flow through them into the central passage of the valve stem (see FIG. 7).

Three roller shafts 20 are mounted to the outer surface of the forward portion 12a of the socket body 12. The three shafts 20 are circumferentially spaced apart about 120° from one another. The shafts are oriented with their axes directed radially relative to the socket body 12. Each roller shaft 20 supports a cam roller 22 mounted coaxially about the shaft, such that the cam roller 22 is able to freely rotate about the shaft.

The socket member 10 also includes a plurality of alignment holes 24a, 24b, 26a, 26b, 28a, and 28b (FIG. 5) extending axially into the forward end of the socket body 12. The alignment holes are arranged in pairs that are circumferentially spaced about the socket body. The distance between the pair of holes 24a and 24b differs from that between the pair of holes 26a and 26b, which in turn differs from the distance between the pair of holes 28a and 28b; in other words, each pair has a spacing distance different from that of the other pairs. Additionally, the circumferential spacing between the pair 24a, b and the pair 26a, b is different from that between the pair 26a, b and the pair 28a, b, for reasons explained below.

The plug member 30 includes a generally cylindrical plug body 32 having an outer surface slightly smaller in diameter than the inner surface of the tubular forward portion of the socket body 12. A forward portion 32a of the plug body 32 is tubular. The rear portion 32b of the plug body defines a plurality of apertures 36 (one of which is shown in FIG. 6A) extending axially through the plug body and spaced apart in a nonlinear array matching that of the first coupling devices 18 of the socket member. A plurality of second coupling devices 38 are supported by the plug body 32. Forward ends of the second coupling devices 38 extend through the apertures 36, such that the second coupling devices can all be simultaneously aligned with the first coupling devices of the socket member when the plug member is in the correct rotational orientation relative to the socket member. In the illustrated embodiment, the forward ends of the second coupling devices 38 are generally co-planar with the forward end of the plug body 32. The second coupling devices 38 are configured to connect with the first coupling devices 18 of the socket member, as further explained below in connection with FIG. 7.

Each second coupling device 38 comprises a tubular body member 38a that is fixedly secured in the plug body 32 and extends through the aperture 36 in the plug body. The rear end of the body member 38a is connected to a fluid conduit C. An axially slidable valve member 38b is disposed within the forward portion of the tubular body member 38a and is urged forwardly by a compression spring 38c; a stop formed on the body member limits forward movement of the valve member. When the valve member 38b is pushed axially rearwardly (to the left in FIG. 6A), an annular opening is created between the outer periphery of the valve member and the inner surface of the body member so that fluid can flow through the annular opening. In the forwardmost position of the valve member 38b, the valve member closes this annular opening.

The plug member 30 also includes a tubular actuator 40 that coaxially surrounds the plug body 32 and is rotatable relative to the plug body about a central axis thereof. The inner surface of the actuator 40 is spaced radially outward of the outer surface of the tubular forward portion of the plug body 32, thus defining a generally annular space therebetween. The actuator 40 defines three cam slots 42 therein. The cam slots 42 are circumferentially spaced with the same spacing as the cam rollers 22 of the socket member, i.e., about 120° from one another, and each slot is slightly wider than the diameter of the cam rollers. Each cam slot 42 is open at the forward end of the actuator 40, extends generally axially rearward for a short distance, then extends generally in a helical direction having a rearward axial component, and finally extends generally circumferentially with no rearward axial component. The forward wall of each cam slot 42 defines a cam surface 43 (FIG. 2) along which the cam rollers 22 ride, as further explained below.

The plug member 30 further includes a plurality of axially oriented alignment pins 44a, 44b, 46a, 46b, 48a, and 48b fixed relative to the plug body 32 and located in the annular space between the actuator 40 and the plug body. The pins are located at the same radius from the central axis of the plug body 32 as the radius of the socket member's alignment holes from the central axis of the socket body. The pins are arranged in pairs and are located in the circumferential direction so that all of the pin pairs can simultaneously be received in the corresponding pairs of alignment holes; thus, pins 44a and 44b are respectively received in holes 24a and 24b, pins 46a and 46b are respectively received in holes 26a and 26b, and pins 48a and 48b are respectively received in holes 28a and 28b. The pins are located with respect to the second coupling devices 38 so that when the pins are all received in their corresponding alignment holes, the second coupling devices are properly aligned with the first coupling devices 18 of the socket member. If the second coupling devices are not properly aligned with the first coupling devices, then at least one pin of each pair will abut the forward end of the socket body and prevent the plug body from being inserted farther into the socket body.

FIGS. 6A and 6B illustrate a first step in coupling together the socket and plug members of the quick-action fluid coupler. As shown, the socket member 10 is affixed to a bulkhead 50 defining an aperture through which the forward end of the socket member protrudes. The plug member 30 is positioned with its forward end facing the forward end of the socket member. The plug body 32 is rotated about its axis as necessary to place it in approximately the correct rotational alignment relative to the socket member; an alignment marking (not shown) may be provided on the plug member to assist the operator in putting the plug body in this approximately aligned position. The actuator 40 of the plug member is rotated so that the entrances of the cam slots 42 are aligned with the cam rollers 22 of the socket member. The plug member is axially advanced toward the socket member and the forward end of the plug body is engaged in the forward end of the socket body, and the plug body is pushed axially into the socket body. If the plug body is perfectly aligned relative to the socket body, the alignment pins 44a,b, 46a,b, 48a,b will be received into the corresponding alignment holes 24a,b, 26a,b, 28a,b, and the plug body can then be advanced axially until the forward ends of the second coupling devices 38 of the plug member abut or are closely adjacent to the forward ends of the first coupling devices 18 of the socket member. On the other hand, if the plug body is not perfectly aligned with the socket body, at least one pin of each pair of pins will abut the forward end of the socket body. The coupler advantageously is configured such that in this condition, the forward ends of the second coupling devices are still spaced from the forward ends of the first coupling devices. The plug body is rotated slightly in one direction or the other to bring the pins into alignment with the alignment holes, and the plug body is then pushed farther into the socket body. At this point, the cam rollers 22 are engaged in the cam slots 42 of the actuator 40.

To complete the coupling process, the actuator 40 is rotated about its axis to cause the cam rollers 22 to ride along the cam slots 42. The actuator advantageously includes handles 52 to assist in rotating it. The engagement between the cam rollers 22 and the cam surfaces 43 of the cam slots results in the actuator 40, and hence the entire plug member 30, being axially advanced toward the rear end of the socket member 10. This causes the second coupling devices 38 to be connected to the first coupling devices 18. In the coupled condition, as shown in FIG. 7, the valve stem 18a of each first coupling device 18 pushes the valve member 38b of the corresponding second coupling device toward the rear of the plug member 30, thereby opening the second coupling devices. At the same time, the body member 38a of each second coupling device pushes the plunger 14 and the valve member 18b of the corresponding first coupling device 18 toward the rear of the socket member 10, thereby opening the first coupling devices. A continuous flow path between each pair of first and second coupling devices is thus established.

To disconnect the plug member from the socket member, the actuator 40 is rotated in the opposite direction, which causes the plug member to be withdrawn from the socket member. The springs 18c and 38c close the respective coupling devices 18 and 38 as the plug member is withdrawn.

The invention thus enables a plurality of fluid-conducting conduits to be connected simultaneously to a plurality of other fluid-conducting conduits. Because a cam arrangement is employed for effecting the required relative axial movement of the coupling members, the coupling mechanism in accordance with the invention is suitable for connecting conduits under pressure. Cross-contamination of different fluid supplies is prevented by the alignment pin and hole arrangement that ensures proper alignment of the first coupling devices 18 with the correct second coupling devices 38 before any contact can occur therebetween.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multi-port fluid coupling for simultaneously connecting a plurality of first fluid lines to corresponding second fluid lines, comprising:

a socket member having a tubular socket body defining a cavity therein, the socket body having a forward end and a rear end, the socket member further comprising a plurality of valved, push-to-connect first coupling devices mounted within the cavity and arranged in a non-linear array, each first coupling device having a front end face proximate the forward end of the socket body, the socket body having a substantially cylindrical inner surface;

a plug member having a tubular plug body defining a cavity therein, the plug body having a forward end and a rear end, the plug member further comprising a plurality of valved, push-to-connect second coupling devices mounted within the cavity of the plug body and arranged in a non-linear array matching that of the first coupling devices, each second coupling device having a front end face and being configured to connect with a corresponding one of the first coupling devices when said coupling devices are axially pushed together such that valves of the coupling devices are opened to establish a flow path therebetween, the plug body having a substantially cylindrical outer surface of smaller diameter than the inner surface of the socket body such that the forward end of the plug body is axially receivable into the forward end of the socket body to cause the front end faces of the second coupling devices to abut the front end faces of the first coupling devices, further axial movement of the plug body into the socket body causing the first and second coupling devices to be connected; and cooperative first and second cam members respectively mounted on the socket member and plug member and engageable with each other upon initial engagement of the plug member with the socket member, one of the first and second cam members being rotatable relative to the other about an axis of the multi-port fluid coupling so as to axially advance the plug body into the socket body to connect the first and second coupling devices.

2. The multi-port fluid coupling of claim 1, wherein the cam members comprise cam surfaces defined on one of the socket and plug members and cam followers mounted on the other of the socket and plug members for contacting and riding along the cam surfaces, the cam surfaces each having a first portion that extends generally helically along said one of the socket and plug members such that rotation of the cam surfaces about the axis relative to the cam followers causes the cam followers to ride along the first portions of the cam surfaces thereby axially advancing the plug body into the socket body.

3. The multi-port fluid coupling of claim 2, wherein the plug member includes an actuator rotatably mounted coaxially about the plug body, the cam surfaces being defined by slots formed in the actuator, and wherein the cam followers are mounted on the socket body for engagement in the slots in the actuator.

4. The multi-port fluid coupling of claim 3, wherein the cam followers comprise rollers mounted on the plug body with rotational axes of the rollers oriented radially relative to the plug body.

5. The multi-port fluid coupling of claim 3, wherein the cam surfaces each comprises a second portion at a terminal end of the slot, the second portions of the cam surfaces being configured to cause no further axial advancement of the plug body into the socket body as the cam followers ride along the second portions, the second portions thus serving to lock the socket and plug members together.

6. The multi-port fluid coupling of claim 5, wherein the second portions of the cam surfaces extend circumferentially along the actuator.

7. The multi-port fluid coupling of claim 3, further comprising at least one handle mounted on the actuator for grasping to aid in rotating the actuator.

8. The multi-port fluid coupling of claim 1, further comprising:

male alignment members mounted on one of the socket and plug bodies and female alignment members defined in the other of the socket and plug bodies, the female alignment members being aligned with the male alignment members in only one rotational orientation of the plug body relative to the socket body in which orientation the first and second coupling devices are properly aligned, and wherein the male alignment members are arranged to contact said other of the socket and plug bodies to prevent the front end faces of the first and second coupling device from coming into contact until the male alignment members are engaged in the female alignment members.

9. The multi-port fluid coupling of claim 8, wherein the male alignment members are mounted on the plug member and the female alignment members are defined in the socket body.

10. The multi-port fluid coupling of claim 9, wherein the male alignment members comprise pins located radially outwardly of the plug body and spaced apart circumferentially, and the female alignment members comprise holes defined in the socket body for receiving the pins.

11. The multi-port fluid coupling of claim 10, wherein the pins and the holes are circumferentially spaced non-uniformly such that all of the pins align with corresponding holes in only one rotational orientation of the plug body relative to the socket body.

12. The multi-port fluid coupling of claim 11, wherein the pins are arranged in a plurality of pairs, the pins of each pair being circumferentially spaced by a distance that is less than a spacing distance between adjacent pairs, the pairs being circumferentially spaced non-uniformly.

13. The multi-port fluid coupling of claim 12, wherein the distance between the pins of each pair is different from the distance between the pins of the other pairs.

14. A multi-port fluid coupling for simultaneously connecting a plurality of first fluid lines to corresponding second fluid lines, comprising:

a socket member having a tubular socket body defining a cavity therein, the socket body having a forward end and a rear end, the socket member further comprising a plurality of valved, push-to-connect first coupling devices mounted within the cavity and arranged in a non-linear array, each first coupling device having a front end face proximate the forward end of the socket body, the socket body having a substantially cylindrical inner surface;

a plug member having a tubular plug body defining a cavity therein, the plug body having a forward end and a rear end, the plug member further comprising a plurality of valved, push-to-connect second coupling devices mounted within the cavity of the plug body and arranged in a non-linear array matching that of the first coupling devices, each second coupling device having a front end face and being configured to connect with a corresponding one of the first coupling devices when said coupling devices are axially pushed together such that valves of the coupling devices are opened to establish a flow path therebetween, the plug body having a substantially cylindrical outer surface of smaller diameter than the inner surface of the socket body such that the forward end of the plug body is axially receivable into the forward end of the socket body to cause the front end faces of the second coupling devices to abut the front end faces of the first coupling devices, further axial movement of the plug body into the socket body causing the first and second coupling devices to be connected; and male alignment members mounted on one of the socket and plug bodies and female alignment members defined in the other of the socket and plug bodies, the female alignment members being aligned with the male alignment members in only one rotational orientation of the plug body relative to the socket body in which orientation the first and second coupling devices are properly aligned, and wherein the male alignment members are arranged to contact said other of the socket and plug bodies to prevent the front end faces of the first and second coupling device from coming into contact until the male alignment members are engaged in the female alignment members.

15. The multi-port fluid coupling of claim 14, wherein the male alignment members are mounted on the plug member and the female alignment members are defined in the socket body.

16. The multi-port fluid coupling of claim 15, wherein the male alignment members comprise pins located radially outwardly of the plug body and spaced apart circumferentially, and the female alignment members comprise holes defined in the socket body for receiving the pins.

17. The multi-port fluid coupling of claim 16, wherein the pins and the holes are circumferentially spaced non-uniformly such that all of the pins align with corresponding holes in only one rotational orientation of the plug body relative to the socket body.

18. The multi-port fluid coupling of claim 17, wherein the pins are arranged in a plurality of pairs, the pins of each pair being circumferentially spaced by a distance that is less than a spacing distance between adjacent pairs, the pairs being circumferentially spaced non-uniformly.

19. A socket member for a multi-port fluid coupling that simultaneously connects a plurality of first fluid lines to corresponding second fluid lines, comprising:

a tubular socket body defining a cavity therein, the socket body having a forward end and a rear end, and a plurality of valved, push-to-connect coupling devices mounted within the cavity and arranged in a non-linear array, each coupling device having a front end face proximate the forward end of the socket body, the socket body having a substantially cylindrical inner surface; and a plurality of circumferentially spaced cam rollers mounted on the socket body for engaging cam surfaces on a cooperative plug member of the multi-port fluid coupling.

20. A plug member for a multi-port fluid coupling that simultaneously connects a plurality of first fluid lines to corresponding second fluid lines, comprising:

a tubular plug body defining a cavity therein, the plug body having a forward end and a rear end, and a plurality of valved, push-to-connect coupling devices mounted in a non-linear array within the cavity of the plug body, the plug body having a substantially cylindrical outer surface;

an actuator rotatably mounted about the plug body; and a plurality of circumferentially spaced cam members defined in the actuator for engaging cam members on a corresponding socket member of the multi-port fluid coupling, wherein the cam members comprise cam surfaces each including a first portion that extends helically along the actuator with a rearward axial component toward a rear end of the actuator.

21. The plug member of claim 20, wherein the cam surfaces are defined by slots in the actuator.

22. The plug member of claim 20, wherein the cam surfaces each includes a second portion that extends with no rearward axial component.

* * * * *